UNITED STATES PATENT OFFICE.

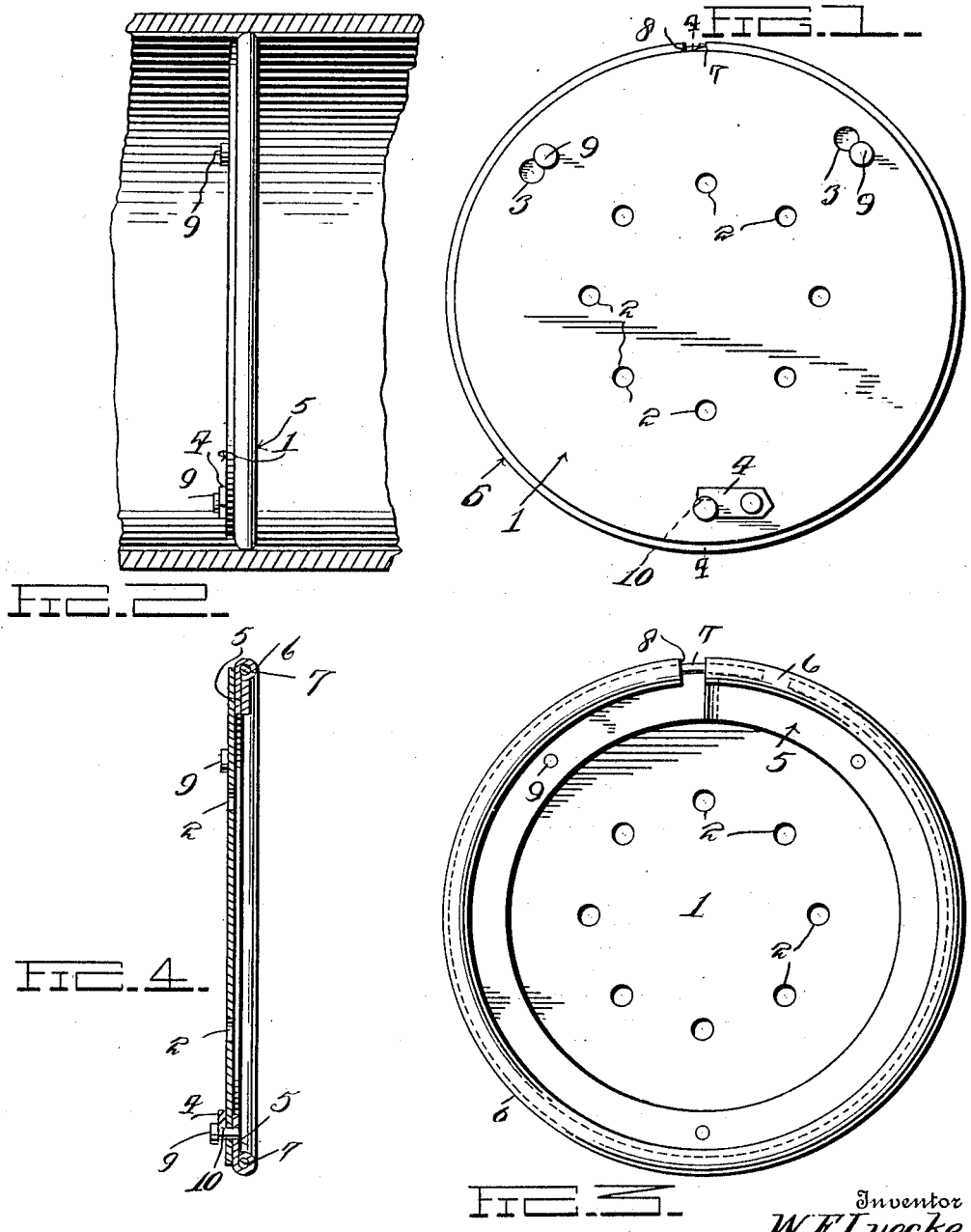

WILLIAM F. LUECKE, OF MANAWA, WISCONSIN.

CHEESE-HOOP FOLLOWER.

1,051,848. Specification of Letters Patent. Patented Jan. 28, 1913.

Application filed June 12, 1912. Serial No. 703,226.

*To all whom it may concern:*

Be it known that I, WILLIAM F. LUECKE, a citizen of the United States, residing at Manawa, in the county of Waupaca, State of Wisconsin, have invented certain new and useful Improvements in Cheese-Hoop Followers; and I do hereby declare the following to be a full, clear, and exact description of the invention, such as will enable others skilled in the art to which it appertains to make and use the same.

This invention is directed to new and useful improvements in cheese hoop followers and has for its object to construct a device of this character entirely from metal.

A further object of the invention is to so construct a device of this type with an expansible rim which will fit snugly against the interior of the hoop and one which may be conveniently taken apart for cleaning.

A still further object of the invention is to provide a cheese hoop follower so that the whey may pass from one side thereof to the other so that the same may be drained off.

With these and other objects in view, this invention resides in the novel features of construction, formations, combinations and arrangements of parts to be hereinafter more fully described, claimed and illustrated in the accompanying drawing, in which:—

Figure 1 is a plan view of the device. Fig. 2 is a longitudinal sectional view through a cheese hoop showing the device in place. Fig. 3 is a bottom plan view of the same. Fig. 4 is a sectional view on line 4—4 of Fig. 1.

The follower consists of a disk 1 formed from any suitable metal, said disk being provided with a series of perforations 2, which permits the whey to pass from one side of the disk to the other so that the same may be drained off as desired. The disk is provided near its periphery with a series of button hole slots 3, one of which has pivotally connected adjacent the head thereof, a latch 4, the purpose of which will appear later.

The rim 5, is provided with a bead 6, and in which is clamped a wire ring 7, one end of which projects from the bead and is adapted for sliding engagement in the adjacent end of the bead, said rim being split as at 8. One end of the rim overlaps the meeting ends of the adjacent portion of the rim, which forms a joint at the meeting end of the rim, but at the same time allows said rim to expand and contract, whereby the same may be readily placed within the hoop and will be held in tight engagement with the inner surface thereof.

Mounted upon the rim 5 is a plurality of headed lugs 9 which are adapted to engage in the slots 3 of the disk 1, and when said disk is partially rotated, said lugs will engage the slots 3, and when the latch 4 is swung inwardly, the shoulder 10 formed thereon will engage the shank of one of the lugs, thus preventing accidental displacement of the disk from said rim, but at the same time allowing said rim to expand and contract.

From this construction it will be seen that a cheese hoop follower has been produced which is simple in construction and one which may be manufactured at a minimum cost.

What is claimed is:—

1. A cheese hoop follower consisting of an expansible rim, headed lugs carried upon the rim, a disk having slots formed adjacent its periphery and adapted to be engaged by the lugs, and means for engaging one of the lugs to hold said disk against accidental rotation upon said rim.

2. A cheese hoop follower consisting of a rim, said rim being split and having a bead formed upon its outer edge, a split ring clamped in the bead, one end of said ring being adapted to engage the adjacent end of said bead, headed lugs carried upon the rim, a perforated disk having button hole slots formed adjacent its periphery, a latch pivotally mounted adjacent one of the slots and adapted to engage one of the lugs when the disk is in place upon the rim, thereby preventing accidental rotation of said disk upon the rim.

In testimony whereof, I affix my signature, in presence of two witnesses.

WILLIAM F. LUECKE.

Witnesses:
A. J. BRONSTAD,
WM. N. MARTIN.

Copies of this patent may be obtained for five cents each, by addressing the "Commissioner of Patents, Washington, D. C."